(12) United States Patent
Zhou et al.

(10) Patent No.: US 12,518,526 B2
(45) Date of Patent: Jan. 6, 2026

(54) DEFECT DETECTION AND IMAGE COMPARISON OF COMPONENTS IN AN ASSEMBLY

(71) Applicant: Future Dial, Inc., Sunnyvale, CA (US)

(72) Inventors: Yan Zhou, Mountain View, CA (US); George Huang, Los Altos Hills, CA (US); Jisheng Li, Los Altos, CA (US)

(73) Assignee: Future Dial, Inc., Sunnyvale, CA (US)

( * ) Notice: Subject to any disclaimer, the term of this patent is extended or adjusted under 35 U.S.C. 154(b) by 0 days.

(21) Appl. No.: 18/438,811

(22) Filed: Feb. 12, 2024

(65) Prior Publication Data

US 2024/0185594 A1    Jun. 6, 2024

Related U.S. Application Data

(63) Continuation of application No. 18/151,386, filed on Jan. 6, 2023, now Pat. No. 11,900,666, which is a continuation of application No. 16/882,203, filed on May 22, 2020, now Pat. No. 11,551,349.

(51) Int. Cl.
*G06T 7/00* (2017.01)
*G06V 10/75* (2022.01)
*G06V 10/98* (2022.01)

(52) U.S. Cl.
CPC .............. *G06V 10/98* (2022.01); *G06T 7/001* (2013.01); *G06V 10/759* (2022.01); *G06T 2200/24* (2013.01); *G06T 2207/30108* (2013.01)

(58) Field of Classification Search
CPC .............. G06T 7/001; G06T 2200/24; G06T 2207/30108; G06V 10/751; G06V 10/759; G06V 10/98

USPC .................................................. 382/100, 141
See application file for complete search history.

(56) References Cited

U.S. PATENT DOCUMENTS

| | | |
|---|---|---|
| 5,185,811 A | 2/1993 | Beers et al. |
| 6,122,397 A | 9/2000 | Lee et al. |
| 6,765,666 B1 | 7/2004 | Guest et al. |
| 8,782,727 B1 | 7/2014 | Nagarajan et al. |
| 9,037,912 B1 | 5/2015 | Klein et al. |
| 10,656,206 B1 | 5/2020 | Patil et al. |
| 11,538,148 B2 | 12/2022 | Zhou et al. |
| 11,551,349 B2 | 1/2023 | Zhou et al. |
| 11,842,482 B2 | 12/2023 | Zhou et al. |
| 11,900,666 B2 * | 2/2024 | Zhou ............... G06V 10/98 |
| 2002/0186877 A1 | 12/2002 | Vilella |
| 2004/0075067 A1 | 4/2004 | Mcauliffe |
| 2005/0084148 A1 | 4/2005 | Miranda |

(Continued)

*Primary Examiner* — Sheela C Chawan
(74) *Attorney, Agent, or Firm* — Greenberg Traurig

(57) ABSTRACT

A method is disclosed that includes receiving, by a processing device, a plurality of images of a test assembly. The processing device selects a component in the test assembly and an image of the plurality of images of the test assembly as received. For the component as selected and the image as selected, the processing device compares a plurality of portions of the image as selected to a corresponding plurality of portions of a corresponding profile image and computing a matching score for each of the plurality of portions. The processing device selects a largest matching score from the matching score for each of the plurality of portions as a first matching score for the component as selected and the image as selected. The first matching score is stored for the component as selected and the image as selected.

20 Claims, 8 Drawing Sheets

(56) References Cited

U.S. PATENT DOCUMENTS

| | | |
|---|---|---|
| 2012/0198438 A1 | 8/2012 | Auer |
| 2014/0282071 A1 | 9/2014 | Trachtenberg et al. |
| 2014/0375957 A1 | 12/2014 | Apperson |
| 2018/0300865 A1 | 10/2018 | Weiss et al. |
| 2019/0258225 A1 | 8/2019 | Link et al. |
| 2020/0256911 A1 | 8/2020 | Lang |
| 2021/0366093 A1 | 11/2021 | Zhou et al. |
| 2021/0366094 A1 | 11/2021 | Zhou et al. |
| 2023/0135476 A1 | 5/2023 | Zhou et al. |
| 2023/0162495 A1 | 5/2023 | Zhou et al. |

* cited by examiner

DEFECT DETECTION AND IMAGE COMPARISON OF COMPONENTS IN AN ASSEMBLY

RELATED APPLICATIONS

The present application is a continuation application of U.S. patent application Ser. No. 18/151,386 filed Jan. 6, 2023, issued as U.S. Pat. No. 11,900,666 on Feb. 13, 2024, which is a continuation application of U.S. patent application Ser. No. 16/882,203 filed May 22, 2020, issued as U.S. Pat. No. 11,551,349 on Jan. 10, 2023, the entire disclosures of which application are hereby incorporated herein by reference.

FIELD OF THE TECHNOLOGY

At least some embodiments disclosed herein relate generally to component installation validation. More particularly, the embodiments relate to artificial intelligence systems and methods for computer-aided validation of the installation of a component in an assembly such as a computing device.

BACKGROUND

Device manufacturing, such as mobile devices (e.g., smartphones, tablets, smartwatches, or the like) utilize several components assembled together. The assembly process can include, for example, securing the components together via fasteners (e.g., screws or the like). The assembly process, if not completed properly (e.g., missing screws, incorrect screws, improperly tightened screws, or the like), can cause quality control issues.

Improved methods and systems for validating the proper installation of the various components are desirable.

BRIEF DESCRIPTION OF THE DRAWINGS

References are made to the accompanying drawings that form a part of this disclosure and illustrate embodiments in which the systems and methods described in this Specification can be practiced.

References are made to the accompanying drawings that form a part of this disclosure and illustrate embodiments in which the systems and methods described in this Specification can be practiced.

Like reference numbers represent like parts throughout.

DETAILED DESCRIPTION

Figure 1:
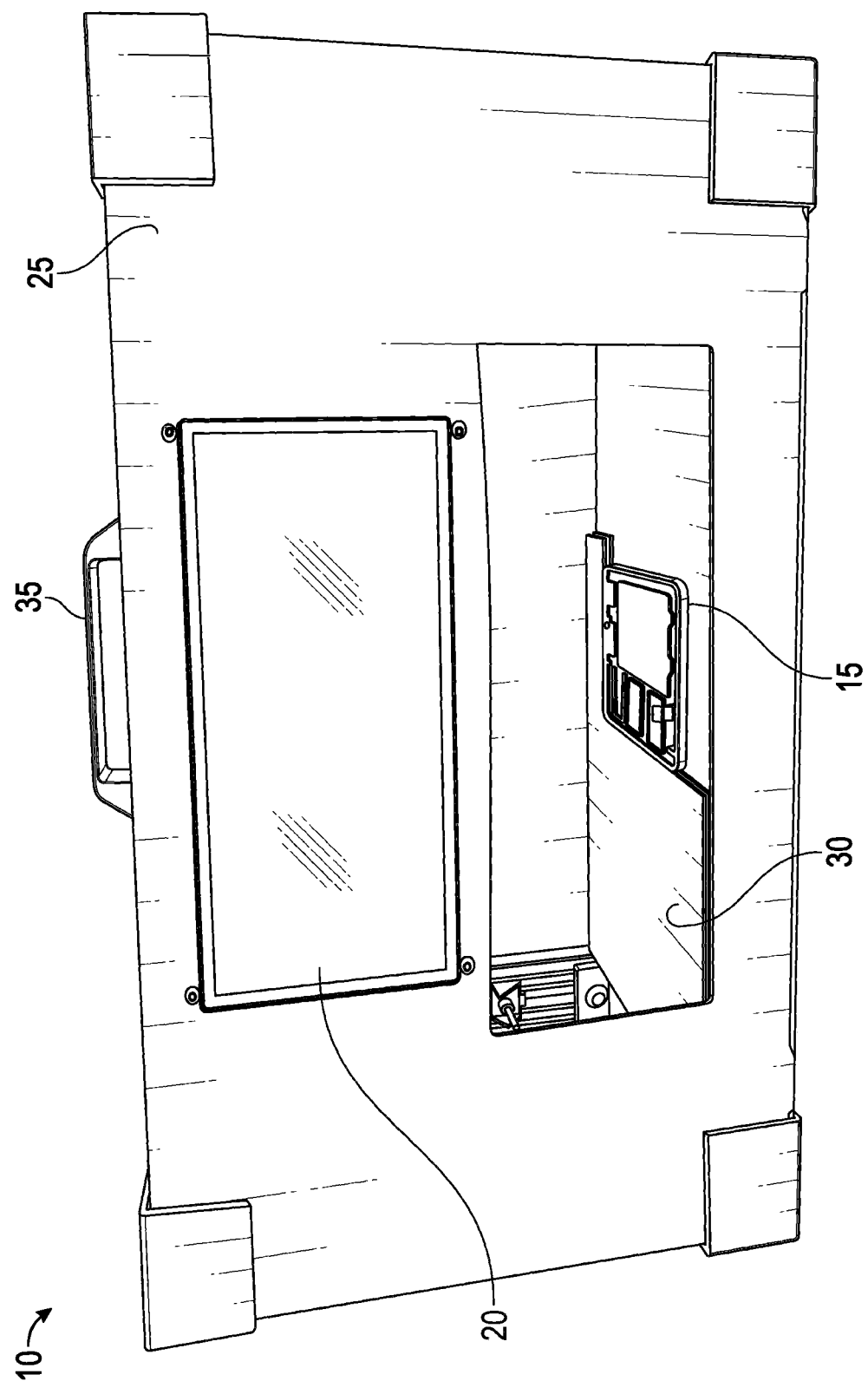
FIG. 1 shows a system for validation of installation of a component in an assembly, according to an embodiment.

Computing devices such as, but not limited to, smartphones, tablets, laptops, smartwatches, and the like, include numerous components that are assembled together. The assembly process can include fasteners (e.g., screws or the like) that keep the various components secured. It is important that these fasteners be installed correctly (e.g., all screws installed (e.g., no missing screws), proper screws installed, screws properly tightened, or the like) as part of the quality control process.

The embodiments disclosed herein are directed to a system and method for inspecting components (e.g., fasteners such as screws or the like) of an assembly (e.g., a computing device such as, but not limited to, a smartphone, a tablet, a laptop, a smartwatch, a cellphone, or the like) during the manufacturing process. The system includes a platform that holds the test assembly (i.e., the assembly being inspected) in a defined position. The defined position is established relative to a plurality of cameras that are arranged to capture different views of the assembly.

When an assembly (e.g., a computing device) is placed onto the platform, an image of the assembly is captured from each of the plurality of cameras. The plurality of cameras are triggered to capture each of the images at the different viewing angles in response to a combination of proximity and motion sensors that identify when the assembly is in place. "Profile images" (i.e., images of a model assembly (e.g., a model assembly (i.e., screws properly installed)) can be captured in a calibration process. The platform maintains the assembly in a generally fixed location. As a result, each image of an assembly being validated (i.e., a test assembly) is taken in the same coordinate system or with a predetermined relationship maintained by the platform relative to the corresponding profile image.

Each of the captured images is compared against the corresponding profile image to determine a matching score representative of whether the components were correctly installed.

In an embodiment, the different viewing angles can provide a more accurate response, as the installation defect may be noticeable in one of the views but appear correct (or not be noticeable) in another of the views. The matching score is based on the comparison of each view. In response to the determination, an indicator (correct, incorrect, requires further checking) including one of the profile images is then displayed on an interface of the system.

A method includes receiving, by a processing device, a plurality of images of a test assembly. The processing device selects a component in the test assembly and an image of the plurality of images of the test assembly as received. For the component as selected and the image as selected, the processing device compares a plurality of portions of the image as selected to a corresponding plurality of portions of a corresponding profile image and computing a matching score for each of the plurality of portions. The processing device selects a largest matching score from the matching score for each of the plurality of portions as a first matching score for the component as selected and the image as selected. The first matching score is stored for the component as selected and the image as selected.

A system includes a processing device configured to receive a plurality of images of a test assembly. The processing device selects a component in the test assembly and an image of the plurality of images of the test assembly as received. For the component as selected and the image as selected, the processing device compares a plurality of portions of the image as selected to a corresponding plurality of portions of a corresponding profile image and computing a matching score for each of the plurality of portions. A largest matching score is selected from the matching score for each of the plurality of portions as a component matching score for the component as selected and the image as selected. The component matching score is stored for the component as selected and the image as selected.

A method is disclosed including capturing a plurality of images using a plurality of cameras, wherein the plurality of cameras are oriented to capture a different view of a test assembly including a plurality of components. The processing device selects a component in the test assembly and an image of the plurality of images of the test assembly as received. For the component as selected and the image as selected, the processing device compares a plurality of portions of the image as selected to a corresponding plurality of portions of a corresponding profile image and computes a matching score for each of the plurality of portions. The processing device selects a largest matching score from the matching score for each of the plurality of portions as a first matching score for the component as selected and the image as selected. An indication is generated of whether the component was correctly installed in the test assembly based on the component matching score.

FIG. 1 shows a system 10 for validation of installation of a component in an assembly 15, according to an embodiment. The system 10 can generally be used to, for example, validate whether a fastener (e.g., a screw or the like) or other component is properly installed in the assembly 15. In an embodiment, the validation can be part of a quality control process during manufacturing. In an embodiment, the system 10 can be used to validate whether the fastener or other component is properly installed at a point after manufacturing (e.g., during refabricating, maintenance, or the like).

In the illustrated embodiment, the assembly 15 is a smartphone. It is to be appreciated that the smartphone is an example, and the assembly 15 can vary beyond a smartphone. Examples of other assemblies 15 include, but are not limited to, a tablet, a smartwatch, a mobile phone other than a smartphone, a personal digital assistant (PDA), a laptop computing device, or the like. Furthermore, the maker or manufacturer of the assembly 15 is not limited. That is, the system 10 can be used to validate the installation correctness of components in assemblies 15 from different manufacturers so long as a calibration procedure is performed to create a profile image for the corresponding assembly 15.

The system 10 includes a display 20 for displaying results of the validation to the user. In an embodiment, the display 20 can be a combined display and input (e.g., a touchscreen). In an embodiment, the display 20 can be a display of a tablet or the like. In such an embodiment, a memory of the tablet can store one or more programs to be executed by a processing device of the tablet for validating the correctness of the installation of the component in the assembly 15.

In the illustrated embodiment, the display 20 is secured to housing 25 of the system 10. In an embodiment, the display 20 can be separate from the housing 25 (i.e., not secured to the housing 25, but positioned near the system 10 and electronically connected to the system 10). However, it may be beneficial to secure the display 20 to the housing 25 to reduce a footprint of the system 10.

A platform 30 is utilized to position the assembly 15 within the system 10 for validation. The platform 30 enables each assembly 15 placed into the system 10 for validation to be placed in substantially the same location. As a result, an amount of effort in determining whether the profile image and the assembly 15 under test (test assembly) is in a same location relative to cameras of the system 10 can be reduced. The platform 30 is shown and described in additional detail in accordance with FIG. 2 below.

In an embodiment, the system 10 can be portable. For example, the illustrated embodiment shows system 10 with a handle 35 for carrying the system 10. It is to be appreciated that portability of the system 10 is optional, and accordingly, the handle 35 is optional. In an embodiment, the system 10 may be sized differently based on the type of assembly 15 to be validated.

Figure 2:
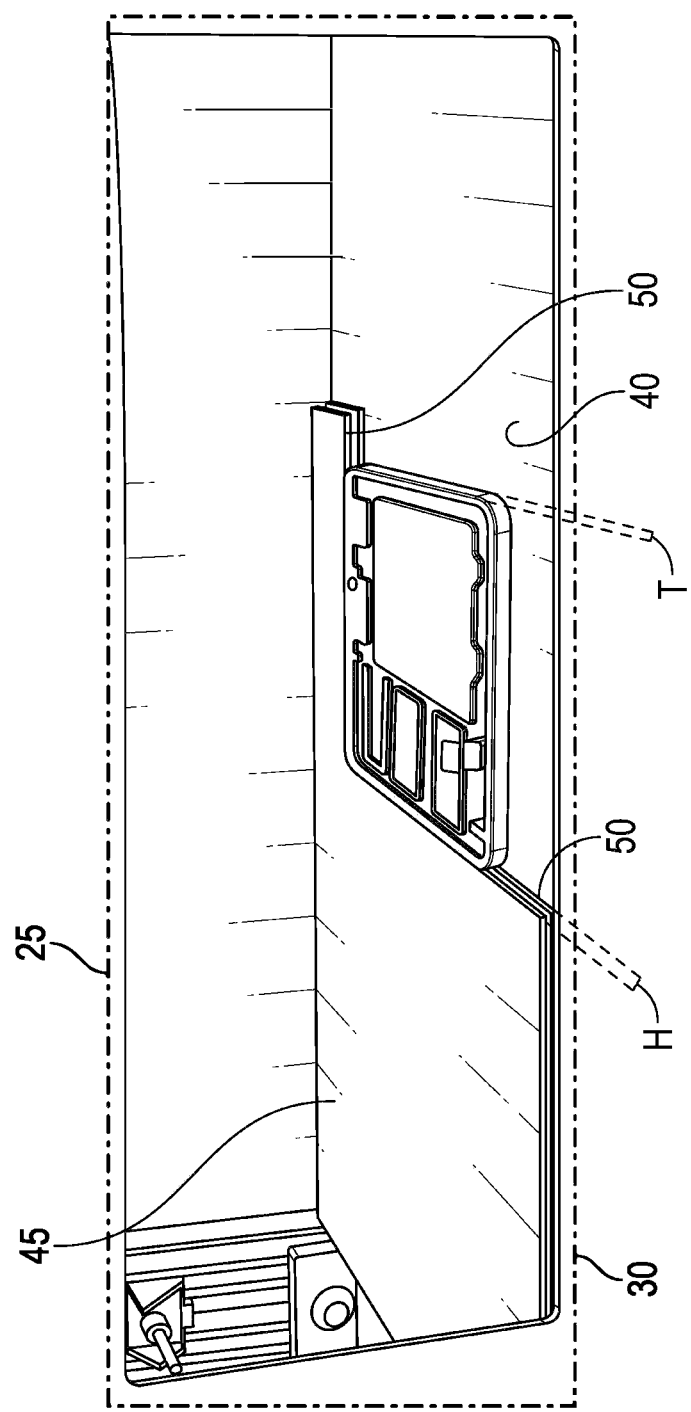
FIG. 2 shows a portion of the system for validation of installation of a component of an assembly of FIG. 1, according to an embodiment.

FIG. 2 shows the platform 30 of the system 10 of FIG. 1 for validation of installation of a component in an assembly 15, according to an embodiment.

The platform 30 includes a tiered surface having a first surface 40 and a second surface 45. A step is thus formed between the first surface 40 and the second surface 45. A plane of the first surface 40 and a plane of the second surface 45 are parallel. In the illustrated embodiment, the second surface 40 is L-shaped when viewed from a top view.

The second surface 45 is positioned a height H from the first surface 40. The height H between the first surface 40 and the second surface 45 creates an abutment surface 50.

The height H is selected such that the abutment surface 50 serves as a stop for the assembly 15 when placed within the system 10. The abutment surface 50 is configured to provide a stop for the assembly 15 on two sides of the assembly 15 (i.e., a major dimension of the assembly 15 and a minor dimension of the assembly 15).

The height H is selected to be smaller than a thickness T of the assembly 15 being validated in the system 10. The height H is selected to be smaller than the thickness T of the assembly 15 to not hinder side views of the assembly 15. The height H is selected to be large enough that an operator inserting the assembly 15 can abut the assembly 15 with the abutment surface 50. In this manner, the abutment surface 50 serves as a stop for the operator when inserting the assembly 15 into the system 10. In an embodiment, the height H can be substantially the same as the thickness T of the assembly 15.

The configuration of the platform 30 is helpful in establishing the location of the assembly 15. By including the platform 30, the system 10 can be calibrated to generate the profile images using a single assembly since the coordinate system is generally fixed. The platform 30 can, as a result, be used to account for minor variations in placement of the assembly 15 by the operator as the offset from the expected coordinated system can be determined based on the location of the assembly 15 relative to a calibration assembly 15.

Figure 3:
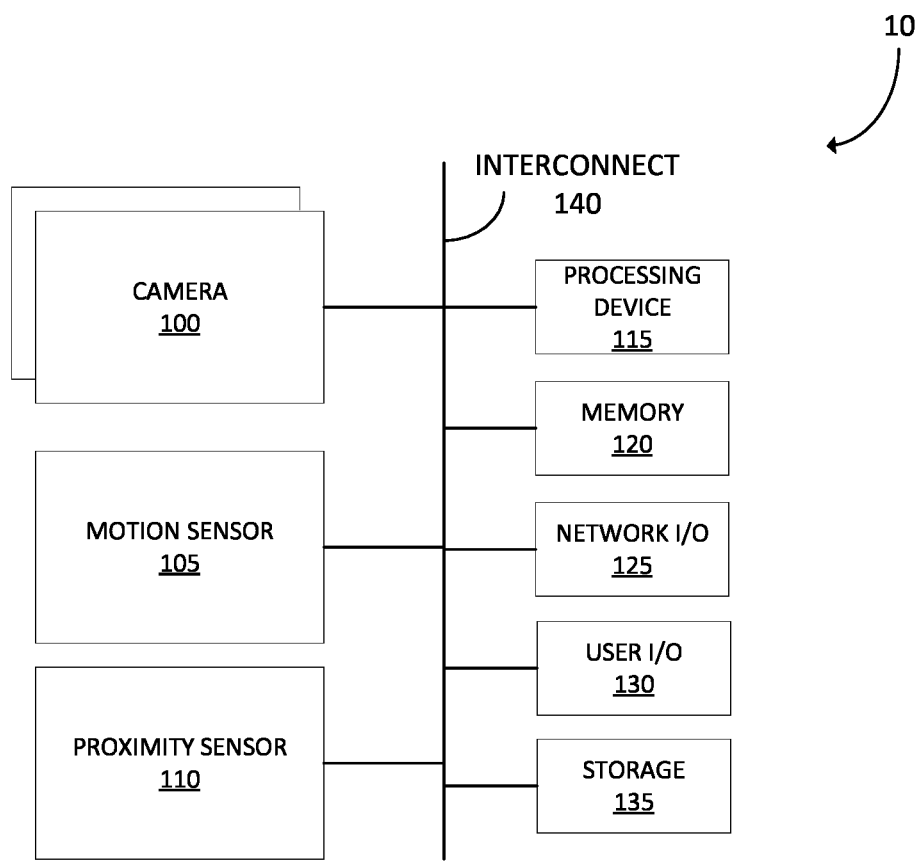
FIG. 3 shows a schematic architecture for the system of FIG. 1, according to an embodiment.

FIG. 3 shows a schematic architecture for the system 10 of FIG. 1, according to an embodiment.

The system 10 generally includes a plurality of cameras 100; a motion sensor 105; a proximity sensor 110; a processing device 115, memory 120, a network input/output (I/O) 125, user I/O 130, storage 135, and an interconnect 140. The processing device 115, memory 120, network input/output (I/O) 125, user I/O 130, storage 135, and interconnect 140 can be within the housing 25 in an embodiment. In an embodiment, the processing device 115, memory 120, network input/output (I/O) 125, user I/O 130, storage 135, and interconnect 140 can be external from the housing 25.

The plurality of cameras 100 are arranged in the system 10 to capture different views of the assembly 15. In an embodiment, the cameras 100 are digital cameras. For example, in an embodiment the system 10 includes three cameras 100 arranged to capture a top view, an up-front view, and an up-side view. In an embodiment, the system 10 includes four cameras 100 arranged to capture a top view, an up-front view, a first up-side view, and a second (opposite) up-side view. It will be appreciated that a single camera 100 could be used, although accuracy may be improved when a plurality of cameras 100 are used as a component may appear to be correctly installed in a first view but be determined to be incorrectly installed in a second view.

The motion sensor 105 can be, for example, a laser sensor that can be triggered when an object (i.e., assembly 15) breaks the laser signal. The motion sensor 105 can be installed at the opening to the housing 25. In an embodiment, the motion sensor 105 may not be included.

The proximity sensor 110 can be a sensor to determine when an object is placed near it. The proximity sensor 110 can be placed in the platform 30 of the system 10. In an embodiment, when the motion sensor 105 is triggered and the proximity sensor 110 detects an object, the cameras 100 can capture images of the assembly 15 on the platform 30. In an embodiment, the proximity sensor 110 can be included regardless of whether the motion sensor 105 is present. In an embodiment with both motion sensor 105 and proximity sensor 110, the image capturing may be performed after the proximity sensor 110 detects the assembly 15.

In an embodiment, automatically causing the image capturing and subsequent validation to be performed using the proximity sensor 110, or a combination of the proximity sensor 110 and the motion sensor 105, can increase a number of assemblies 15 that can be validated in a set period. That is, reducing effort of a human operator, or even allowing for a robotic arm to load the assembly 15 into the system 10 for validation, can reduce an amount of time and effort needed to review the quality of the manufacturing process.

The processing device 115 can retrieve and execute programming instructions stored in the memory 120, the storage 135, or combinations thereof. The processing device 115 can also store and retrieve application data residing in the memory 120. The programming instructions can perform the method described in accordance with FIG. 4 below to determine whether the components of the assembly 15 are properly installed, and additionally, cause display of one of the graphical user interfaces (GUIs) shown and described in accordance with FIGS. 5-7 below.

The interconnect 140 is used to transmit programming instructions and/or application data between the processing device 115, the user I/O 130, the memory 120, the storage 135, and the network I/O 125. The interconnect 140 can, for example, be one or more busses or the like. The processing device 115 can be a single processing device, multiple processing devices, or a single processing device having multiple processing cores. In an embodiment, the processing device 115 can be a single-threaded processing device. In an embodiment, the processing device 115 can be a multi-threaded processing device.

The memory 120 is generally included to be representative of a random-access memory such as, but not limited to, Static Random-Access Memory (SRAM), Dynamic Random-Access Memory (DRAM), or Flash. In an embodiment, the memory 120 can be a volatile memory. In an embodiment, the memory 120 can be a non-volatile memory. In an embodiment, at least a portion of the memory 120 can be virtual memory.

The storage 135 is generally included to be representative of a non-volatile memory such as, but not limited to, a hard disk drive, a solid-state device, removable memory cards, optical storage, flash memory devices, network attached storage (NAS), or connections to storage area network (SAN) devices, or other similar devices that may store non-volatile data. In an embodiment, the storage 135 is a computer readable medium. In an embodiment, the storage 135 can include storage that is external to the user device, such as in a cloud.

Figure 4:
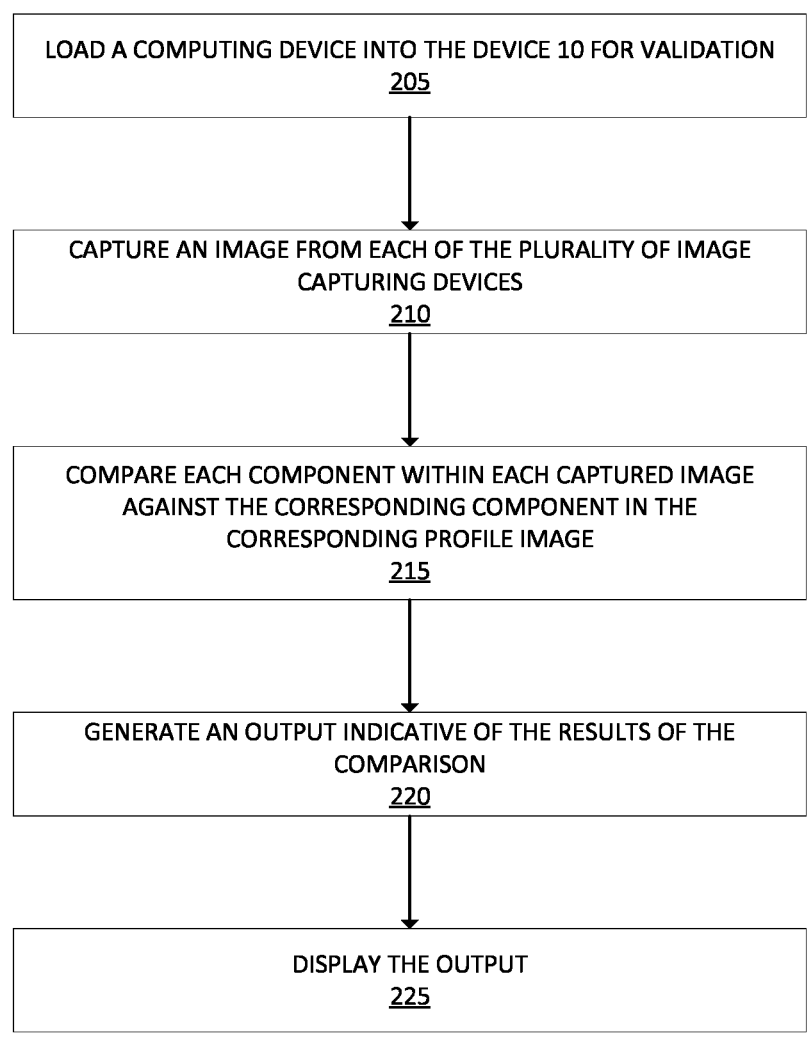
FIG. 4 shows a flowchart for a method of validating installation of a component in an assembly using artificial intelligence, according to an embodiment.

FIG. 4 shows a flowchart for a method 200 of validating installation of a component in an assembly 15 using artificial intelligence, according to an embodiment.

At block 205 a test assembly 15 is loaded into the system 10. This includes abutting the assembly 15 with the abutment surface 50 of the platform 30. In an embodiment, the assembly 15 can be loaded by a human operator. In an embodiment, a robotic or mechanical arm can be automated to place the assembly 15 onto the platform 30. The placement of the assembly 15 can cause the motion sensor 105, the proximity sensor 110, or a combination thereof, to generate a signal indicative of the test assembly 15 being in place.

At block 210, in response to the signal generated by the motion sensor 105, the proximity sensor 110, or a combination thereof, the plurality of cameras 100 each capture an image. As discussed above, the cameras 100 are oriented such that the captured images are of different views of the assembly 15.

At block 215, each component within each of the captured images is compared against the corresponding component in the corresponding profile image. The comparison methodology is discussed in more detail in accordance with FIG. 8 below.

At block 220 an output is generated indicative of the results of the validation (e.g., correct, incorrect, needs checking). The output can be based on a range of the matching score. That is, if the matching score is greater than a first value, then the output can be that the installation is correct; between the first value and a lower second value, the installation may need checking; and between the lower second value and a third value that is lower than the second value, the installation may be incorrect.

At block 225, the output is displayed on the display 20 of the system 10. In an embodiment, the display can include a notation of which components are incorrect or need checking. In an embodiment, to reduce processing effort and increase a speed of the output, the display can include one of the profile images (instead of one of the captured images for the assembly 15 being tested).

Figure 5:
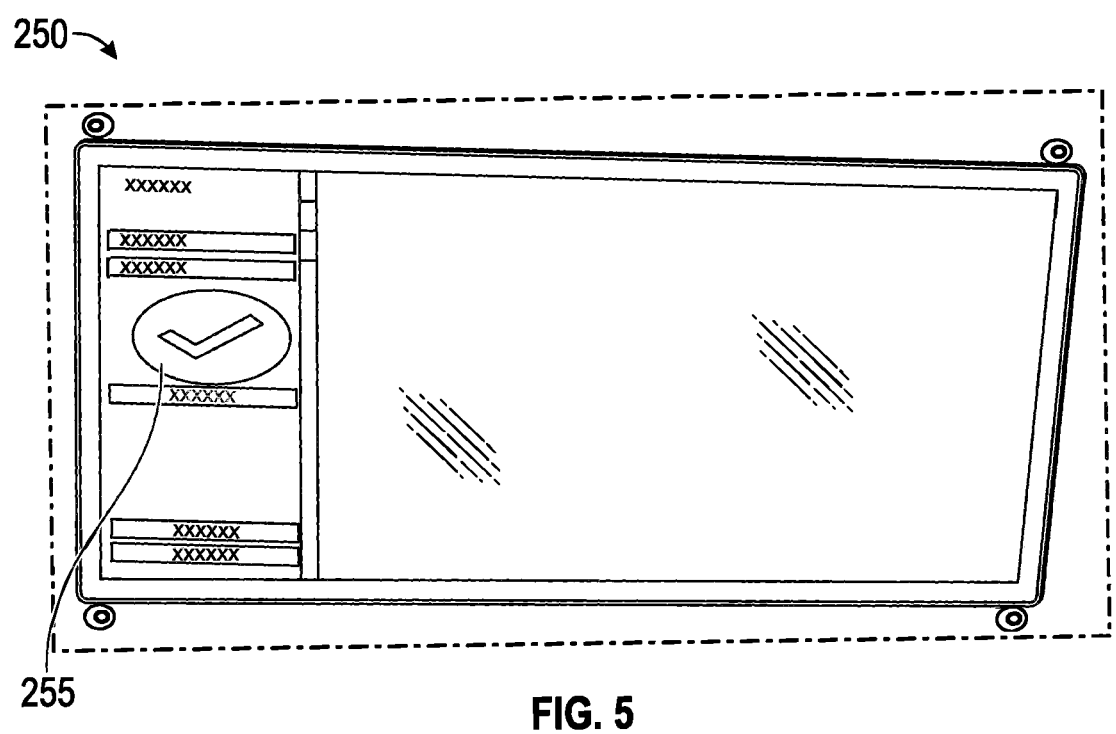
FIG. 5 shows a first graphical user interface (GUI), according to an embodiment.

FIG. 5 shows a first graphical user interface (GUI) 250, according to an embodiment. The first GUI 250 is generally representative of a GUI displayed when the manufacturing component was validated and determined to be correctly installed.

Figure 6:
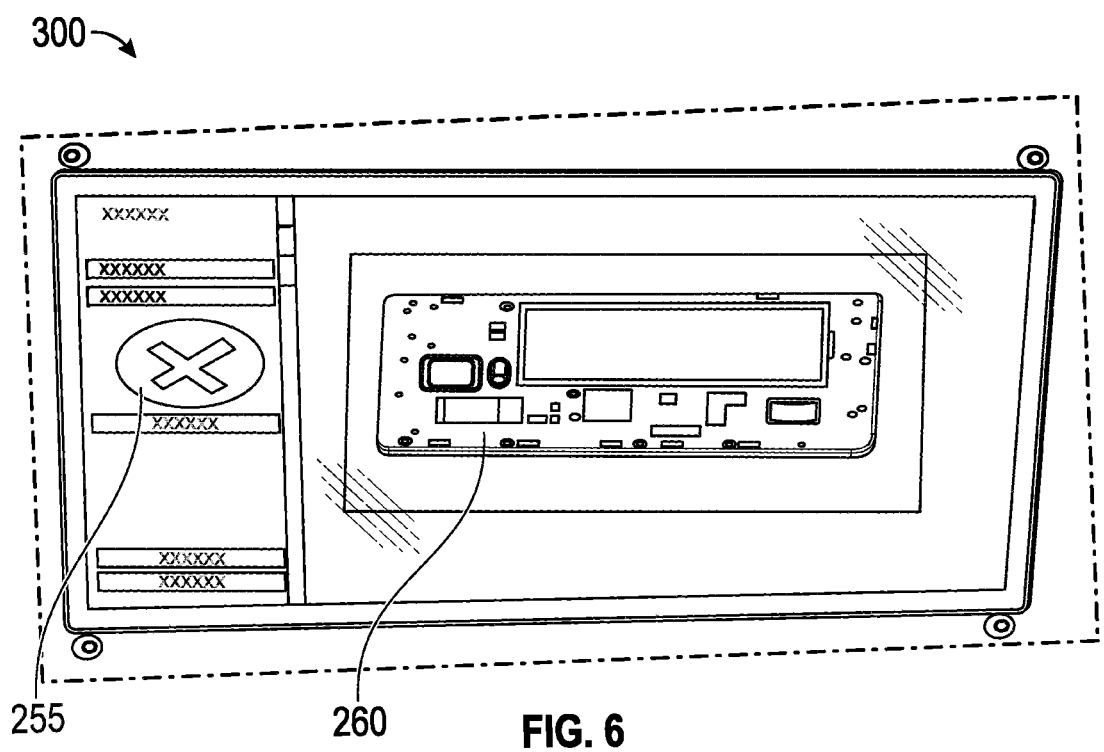
FIG. 6 shows a second GUI, according to an embodiment.

FIG. 6 shows a second GUI 300, according to an embodiment. The second GUI 300 is generally representative of a GUI displayed when the manufacturing component was incorrectly installed.

Figure 7:
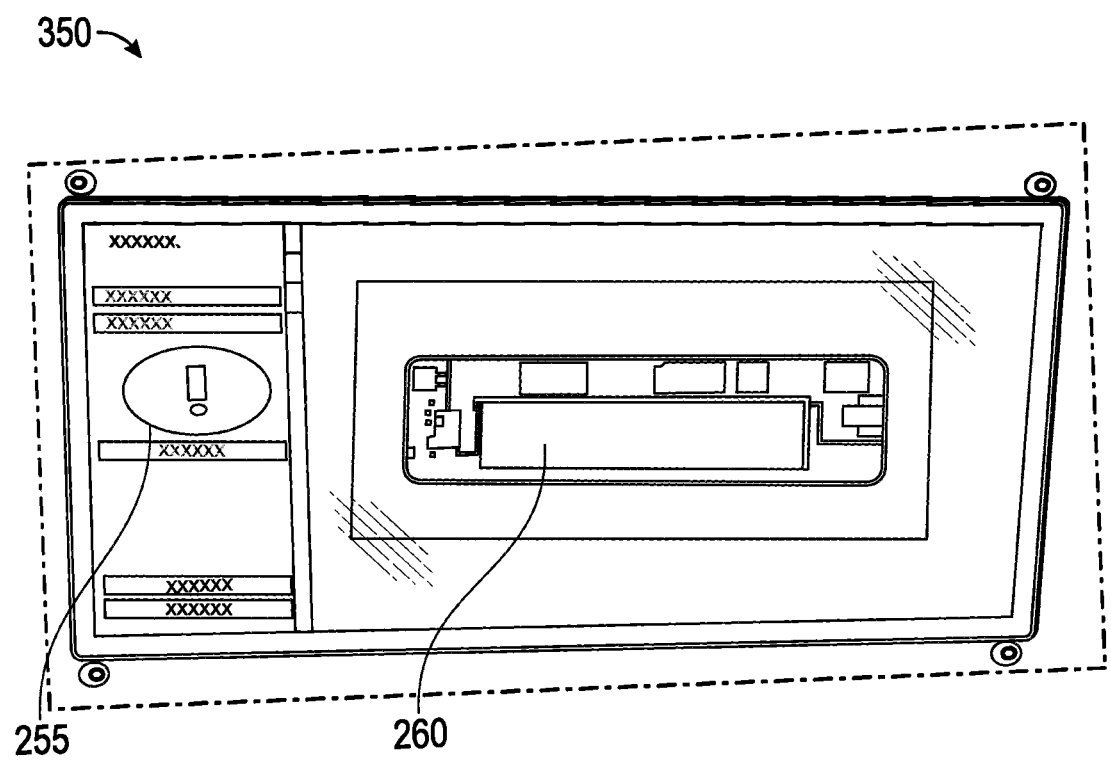
FIG. 7 shows a third GUI, according to an embodiment.

FIG. 7 shows a third GUI 350, according to an embodiment. The third GUI 350 is generally representative of a GUI displayed when the manufacturing component was determined to have a potential issue, or an appropriate confidence factor was not met.

The GUIs 250-350 in FIGS. 5-7 generally include an indicator 255. In the GUIs 300 and 350, because the GUIs are representative of situations where the installation of the component was not validated as being correct, a profile image 260 is displayed showing the correct assembly. It is to be appreciated that the GUI 250 could also display the profile image 260. The indicator 255 can vary based on the GUI to visually represent to the operator whether the component was correctly installed (GUI 250), incorrectly installed (GUI 300), or needs checking (GUI 350). The indicators 255 in the illustrated embodiments are representative and are not intended to be limiting. The image 260 in each of the GUIs 300 and 350 is the same and is a top view of the profile image. It is to be appreciated that the image 260 can vary. That is, a different view can be shown in an embodiment.

Figure 8:
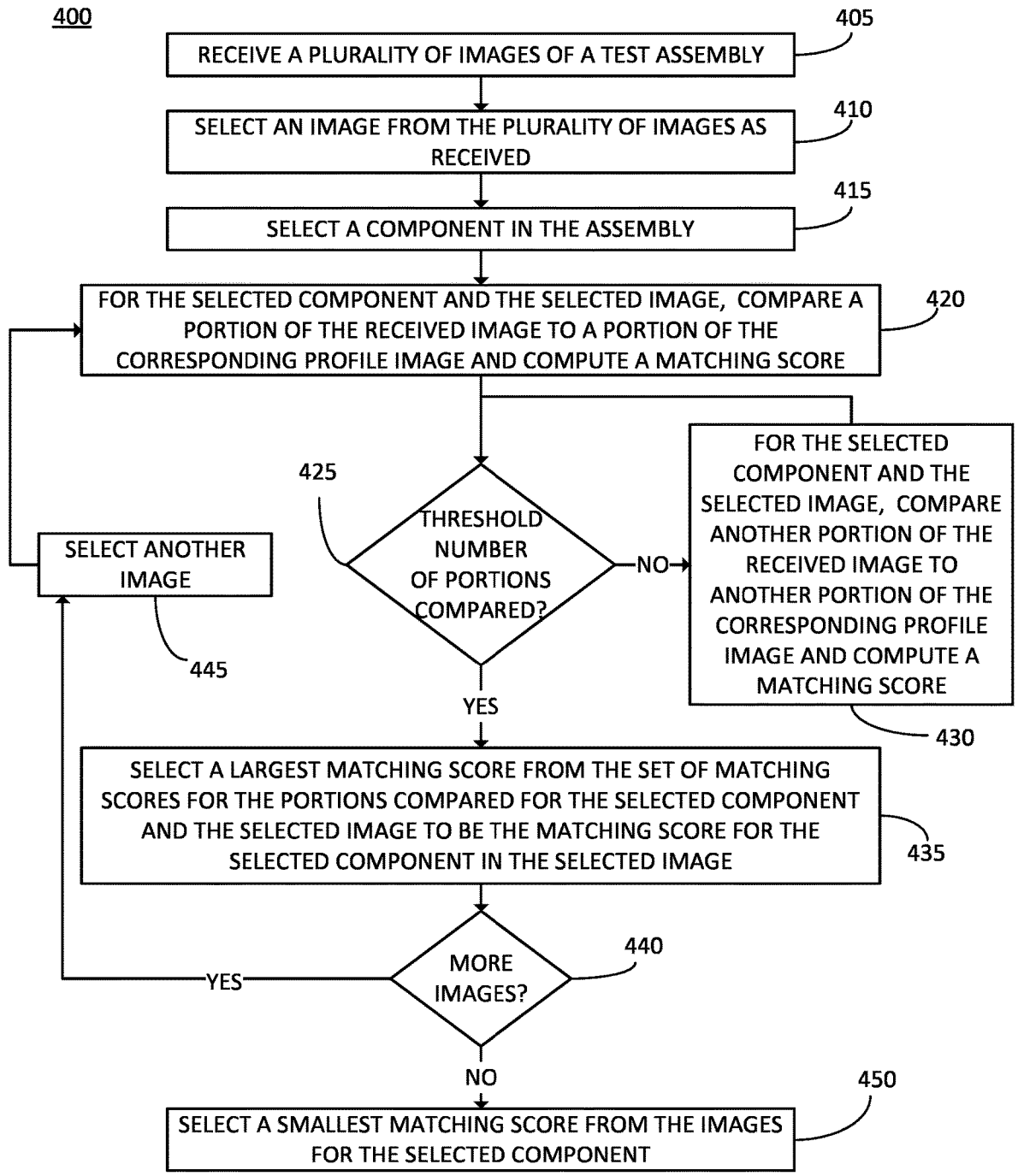
FIG. 8 shows a flowchart for a method 400 for comparing components in images of a test assembly with components in images of a profile assembly, according to an embodiment.

FIG. 8 shows a flowchart for a method 400 for comparing components in images of a test assembly with components in images of a profile assembly, according to an embodiment. As discussed above, the method 400 can be performed at block 215 of the method 200 (FIG. 3). The method 400 generally receives as input, a plurality of images of a test assembly 15 and performs a comparison using artificial intelligence to determine a matching score for components of the test assembly as captured in the test images relative to the profile images.

At block 405, the processing device (e.g., the processing device 115 in FIG. 3) receives a plurality of images of a test assembly (e.g., the assembly 15 shown in FIGS. 1 and 2). The plurality of images of the test assembly 15 correspond to a plurality of profile images captured of a profile assembly during a calibration of the system 10. That is, the plurality of profile images are captured of the same views as the plurality of images of the test assembly 15. The profile assembly is the same type of device as the test assembly 15 and includes correct installation of the components (e.g., screws or the like) being validated. The plurality of profile images can be stored in the storage 135 of the system 10.

At block 410, the processing device 115 selects an image from the plurality of images as received for validation of the test assembly 15.

At block 415, the processing device selects a component in the test assembly 15.

At block 420, for the selected component and selected image, the processing device 115 compares a portion of the selected image to a portion of the corresponding profile image and computes a matching score. In an embodiment, the matching score can be computed using a similarity metric such as, but not limited to, correlation coefficient score. For example, if a center of the component is a point (x, y) in the profile image, the portion would be at (x, y).

At block 425, the processing device 115 can check whether a threshold number of portions of the received image and the corresponding profile image have been compared. The threshold number can be selected to balance a computing effort and an accuracy of the comparison. In an embodiment, the threshold can be selected to be from 50-500. The threshold can be selected to compare enough portions of the images to compensate for minor displacements (e.g., 0-20 pixels or 1-2 mm in physical space) of the component in the test images relative to the component in the profile images.

If at block 425, the threshold has not been met, at block 430 another portion of the received image is compared to another portion of the corresponding profile image. Thus, additional points around (x, y) can be compared to provide a higher accuracy in making the validation. This improvement in accuracy can, for example, be because the multiple samples can compensate for minor displacements (e.g., 0-20 pixels or 1-2 mm in physical space) of the components being tested relative to the components in the profile image. Thus, the sampling of these portions can account for minor variations in the placement of the assembly 15 at block 205 (FIG. 2).

If at block 425, the threshold number of portions has been compared, at block 435, the processing device 115 selects the largest matching score from the set of matching scores for the portions of the received image to be the matching score for the selected component in the selected image. It is to be appreciated that other statistical values could be used for the matching score, such as, but not limited to, the mean, median, or mode.

At block 440, the processing device 115 determines whether more images have been received at block 405 than have been the selected image at block 410. If there are more images, the method 400 continues to block 445, and the processing device selects another image then completes blocks 420-435 for the selected image.

If there are no more images at block 440, the method 400 continues to block 450, and the processing device selects a smallest matching score from the images for the selected component. It is to be appreciated that other statistical values could be used for the matching score, such as, but not limited to, the mean, median, or mode. By selecting the smallest matching score, the method 400 can identify situations in which the component appears to be correctly installed in one image, but is not correctly installed, as identified in another of the images.

In performing the similarity comparison, several bases for determining a component is incorrect can be captured. For example, the validation can identify missing components, improperly installed components (e.g., wrong screw or the like), or installations that are not complete (e.g., a screw is not tightened or is over-tightened) based on orientation of the component. It is to be appreciated that the matching score will be impacted more heavily by a missing or incorrect component than by a misoriented component. The highest matching score for each component is compared across the plurality of images to determine which is relatively smallest. The smallest of the matching scores across the plurality of images is retained as the matching score for that component.

After block 450, the method 400 is complete (and accordingly, block 215) of the method 200 in FIG. 2.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, operations, elements, and/or components, but do not preclude the presence or addition of one or more other features, integers, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A system, comprising:
   at least one sensor configured to:
     generate a signal indicative of an assembly being in a position with respect to the system;
     capture, in response to the signal, at least one image of a component of the assembly; and
   a processing device configured to:
     compute a matching score for the at least one image to a corresponding component in a profile image; and
     determine, based on the matching score being greater than a first threshold value, an output that validates installation of the component of the assembly.

2. The system of claim 1, wherein the processing device is further configured to cause the output to be displayed on a display of the system.

3. The system of claim 1, wherein the at least one camera is further configured to capture the at least one image in a plurality of views of the component of the assembly.

4. The system of claim 1, wherein the at least one sensor is further configured to:
   generate the signal indicative of the assembly being in the position with respect to the system when the assembly is placed in the position.

5. The system of claim 1, wherein the processing device is further configured to:
   determine, based on the matching score being between the first threshold value and a second threshold value that is lower than the first threshold value, that installation for the component is subject to a further check.

6. The system of claim 5, wherein the processing device is further configured to:
   determine, based on the matching score being between the second threshold value and a third threshold value that is lower than the second threshold value, that installation for the component is incorrect.

7. The system of claim 1, wherein the processing device is further configured to:
   cause a display to display the profile image including a notation associated with installation of the component.

8. The system of claim 1, wherein the at least one sensor comprises at least one camera, at least one proximity sensor, at least one motion sensor, or a combination thereof.

9. The system of claim 1, wherein the profile image comprises an image of a profile assembly taken during a calibration of the system.

10. A device, comprising:
    a processing device configured to:
      receive at least one signal comprising at least one image of a component of an assembly from at least one sensor configured to capture the at least one image;
      compute a matching score for the at least one image of component of the assembly to a corresponding component in a profile image; and
      determine, based on the matching score being greater than a threshold value, an output that validates installation of the component of the assembly.

11. The device of claim 10, wherein the processing device is further configured to:
    select the component of the assembly for comparing to the corresponding component in the profile image.

12. The device of claim 10, wherein the processing device is further configured to:
    compute the matching score for the at least one image using a similarity metric.

13. The device of claim 10, wherein the processing device is further configured to:
    determine whether a threshold number of portions of the at least one image and the corresponding component in the profile image have been compared.

14. The device of claim 13, wherein the processing device is further configured to:
    select, based on the threshold number of portions of the at least one image and the corresponding component in the profile image being determined to have been compared, a largest matching score of a plurality of matching scores to serve as the matching score.

15. The device of claim 13, wherein the processing device is further configured to:
    compare, based on the threshold number of portions of the at least one image and the corresponding component in the profile image being determined to not have been compared, additional portions of the at least one image to the corresponding component in the profile image.

16. The device of claim 10, wherein the processing device is further configured to:
    identify, based on the output, at least one missing component or at least one improperly installed component for the assembly.

17. The device of claim 10, wherein the processing device is further configured to:
    receive the at least one signal comprising the at least one image of the component of the assembly from the at least one sensor configured to capture the at least one image when the assembly is in a position.

18. A method, comprising:
    receiving, from at least one sensor and by utilizing a processing device of a system, at least one signal comprising at least one image of a component of an assembly;
    computing, by utilizing the processing device of the system, a matching score for the at least one image of the component of the assembly to a corresponding component in a profile image; and
    generating, based on the matching score being greater than a threshold value and by utilizing the processing device of the system, a first output that validates installation of the component of the assembly.

19. The method of claim 18, further comprising loading the assembly in a position with respect to the system by utilizing a robotic device.

20. The method of claim 18, generating, based on the matching score being less than the threshold value, a second output that indicates that installation of the component of the assembly is incorrect or requires a further check.

* * * * *